United States Patent [19]

Mackey

[11] Patent Number: 5,886,083

[45] Date of Patent: Mar. 23, 1999

[54] ARTIFICIAL SNOW AND METHOD OF MAKING THE SAME

[75] Inventor: Jack D. Mackey, Hawthorne, Calif.

[73] Assignee: Mattel, Inc., El Segundo, Calif.

[21] Appl. No.: 914,585

[22] Filed: Aug. 18, 1997

[51] Int. Cl.$^6$ ..................................................... C08L 5/00
[52] U.S. Cl. ........................ 524/503; 524/43; 524/405; 524/524; 524/577; 523/220
[58] Field of Search ............................. 524/43, 405, 503, 524/524, 577; 523/220

[56] References Cited

U.S. PATENT DOCUMENTS

| | | |
|---|---|---|
| 3,135,648 | 6/1964 | Hawkins . |
| 3,213,051 | 10/1965 | Pink . |
| 3,353,981 | 11/1967 | Jacob . |
| 3,456,589 | 7/1969 | Thomison et al. . |
| 3,632,786 | 1/1972 | Nickerson . |
| 3,714,086 | 1/1973 | Schaefer et al. . |
| 3,784,391 | 1/1974 | Kruse et al. . |
| 3,853,797 | 12/1974 | Pelzig . |
| 3,996,078 | 12/1976 | Klunsch et al. . |
| 4,094,694 | 6/1978 | Long . |
| 4,123,416 | 10/1978 | Potter et al. ............................ 523/111 |
| 4,172,054 | 10/1979 | Ogawa et al. . |
| 4,330,634 | 5/1982 | Rodaway . |
| 4,442,252 | 4/1984 | Sumi et al. . |
| 4,629,751 | 12/1986 | Montgomery . |
| 4,731,389 | 3/1988 | Christopher et al. . |
| 4,784,812 | 11/1988 | Saitoh et al. . |
| 4,972,013 | 11/1990 | Koltisko et al. . |
| 4,980,005 | 12/1990 | Scollard . |
| 5,006,586 | 4/1991 | Touji et al. . |
| 5,157,063 | 10/1992 | Wetherell ................................. 524/503 |
| 5,171,766 | 12/1992 | Mariano et al. ......................... 524/503 |
| 5,258,068 | 11/1993 | Shapero et al. . |
| 5,395,873 | 3/1995 | Mizoule .................................. 524/503 |
| 5,744,534 | 4/1998 | Ishiharada et al. ..................... 524/503 |

FOREIGN PATENT DOCUMENTS

| | | |
|---|---|---|
| 1185031 | 2/1985 | Canada . |
| 3042850 | 11/1979 | Germany . |
| 3238232 | 4/1981 | Germany . |
| 51-125446 | 11/1976 | Japan . |
| 4154411 | 12/1979 | Japan . |
| 0617409 | 12/1975 | Russian Federation . |
| 1060636 | 7/1981 | Russian Federation . |
| 2214186 | 8/1989 | United Kingdom . |

*Primary Examiner*—Andrew E. C. Merriam
*Attorney, Agent, or Firm*—Kolisch, Hartwell, Dickinson, McCormack & Heuser

[57] ABSTRACT

A moldable composition and method of making the same, the composition including a binding mixture and filler in the form of crystalline, irregular, approximately polygonally shaped particles. The binding mixture preferably includes polyvinyl-based binders such as polyvinyl alcohol, water, a cross-linking agent such as borax, and a humectant such as propylene glycol. Furthermore, a cellulose-based thickener may be added to the binding mixture, as may a pH-adjusting compound such as sodium carbonate. The crystalline particles preferably are ground styrene having a maximum dimension ranging from one-half to three millimeters.

30 Claims, 2 Drawing Sheets

ARTIFICIAL SNOW AND METHOD OF MAKING THE SAME

BACKGROUND AND SUMMARY OF THE INVENTION

My invention relates generally to moldable compositions that simulate snow, both in color and structural appearance, but not in temperature. It also relates to methods of making the same. My compositions allow a user, typically a child, to make snow-like objects at room temperature.

The compositions are formed generally from a clear or translucent filler and a binding mixture. The preferred filler is crystalline polystyrene, having particles formed of solid, non-expanded polystyrene preferably crushed or ground to have a crystalline or irregular, approximately polygonal shape and sorted to have a size ranging from about one-half millimeter to three millimeters across. The binding mixture includes polyvinyl alcohol reacted with a cross-linking agent, and it preferably further contains a high percentage of humectant so that the compositions do not dry out if left exposed to air.

My compositions are particularly well-suited for use by children as a tactile toy, similar to modeling clay. They are easy to form and shape, but require a certain degree of care in doing so, particularly if a uniform outer surface of the shaped material is to be maintained. Rapid squeezing or stretching of the compositions tends to cause surface cracks and to make the shaped material look more airy or gel-like. While these properties of the compositions are interesting in their own right, for many modeling projects they are to be avoided. Slow and deliberate forming of the compositions tends to avoid these surface blemishes, or at least continually compensate for the blemishes.

My compositions are stretchable, malleable, and joinable. In this respect, U.S. Pat. No. 5,157,063, incorporated herein by reference, discloses prior art compositions of interest. However, my compositions look and feel very different from this prior art composition. In particular, it is believed that the crystalline structure of the filler particles used in my compositions, and the interaction between the binding mixture and the complex, pointed structure of the filler particles, make my compositions feel and behave very different from these prior compositions.

When squeezing or molding my compositions, there is a noticeable granular structure and resistance to movement as the crystalline filler particles interact with each other. In the prior art compositions, the spherical expanded beads appear to slide past each other much more easily, making for a very different feeling composition. The prior art compositions also failed to exhibit the snow-like cracking and blemishing discussed above.

In discussing the present invention herein, reference is made to the similarities between my compositions and snow. For accuracy, the type of snow referred to is what is known by snow skiers as "corn snow" or "spring snow." It is similar in appearance and texture to what is found in the ice-and-flavoring frozen treat commonly known as a "snow cone."

A snow cone is made up mostly of crystalline pieces of solid ice, together with water in a liquid state. When squeezed or compacted, it makes a tight, compact ball, mostly white in color, with a dark hue imparted by the liquid water. It is not, however, moldable to the extent of my compositions, which can be formed easily into thin sheet-like structures having thicknesses of just a few millimeters.

My invention also includes a method of making the present compositions. This method is believed to produce consistent quality in the compositions, and provide the manufacturer with an efficient and safe process for formulating the compositions, using standard handling and manufacturing equipment.

It is an object of the present invention to provide a modeling composition that simulates the look and feel of snow.

It is a further object of the present invention to provide a method of manufacturing a modeling composition that is efficient and reliable.

Additional objects and advantages of the present invention will be understood more readily after a consideration of the drawings and the Detailed Description of the Preferred Embodiment.

DETAILED DESCRIPTION OF THE PREFERRED EMBODIMENT

Figure 1:
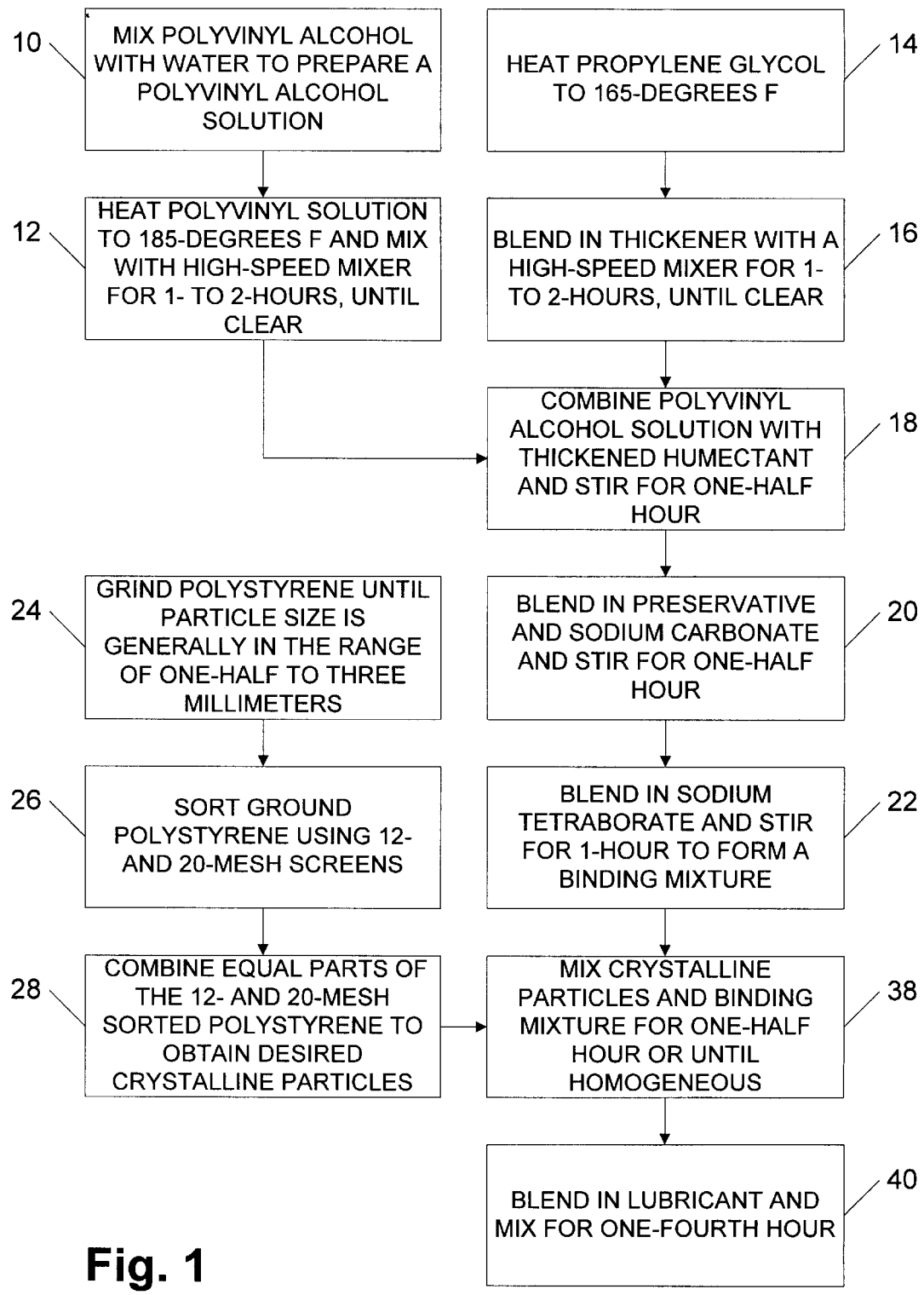
FIG. 1 is a flow chart representing the steps of the preferred method of manufacturing the preferred composition.

The various components of the moldable compositions of the present invention will be described in conjunction with a description of the method of making the compositions. The reader should refer to FIG. 1 for a depiction of the interrelationship of the steps of the method. Each of the blocks in FIG. 1 represents a step in the method, referred to using the reference indicator in FIG. 1 associated with the step, such as "step 10." To keep FIG. 1 as simple as possible, some sub-steps such as heating and stirring a mixture have been combined into a single step in the Figure and in the following description.

The compositions include generally humectant, thickener, binder, solvent for the binder, crystalline filler, lubricant, and preservative. The primary binder preferably is polyvinyl alcohol, such as AIRVOL 205, available from Air Products and Chemicals, Inc. The preferred solvent is deionized water. The polyvinyl alcohol is mixed with the water, at step 10, to produce a polyvinyl alcohol solution.

Preferably, the concentration of the solution is maintained at a relatively high level, approximately 30%. In order to obtain this concentration of polyvinyl alcohol in the polyvinyl alcohol solution, the solution should be heated, at step 12, to approximately 185-degrees F. The heated solution is mixed for one to two hours, or until clear.

The preferred humectant is propylene glycol, which is heated to approximately 160-degrees F, at step 14. A cellulose-based thickener, such as hydroxypropyl cellulose is blended into the heated humectant with a high-speed mixer for one to two hours or until clear, at step 16. KLUCEL HF, available from Aqualon, is one such thickener that has been found to work particularly well.

The polyvinyl alcohol solution from step 12 is combined with the thickened humectant from step 16, and stirred for one-half hour at step 18. At step 20, preservative, such as PHENONIP, available from Nipa Laboratories, Inc., and a pH-adjusting compound, such as sodium carbonate, are blended into the mixture from step 18. Stirring should continue for approximately one-half hour.

In step 22, a cross-linking agent for the polyvinyl alcohol, such as sodium tetraborate (known more commonly as borax) is blended in and stirred for one hour. The collective result of steps 10 through 22 is to form what is referred to herein as a binding mixture.

In step 24, polystyrene is ground or crushed until the particle size generally is in the range of one-half to three millimeters in maximum dimension. The particles that result from step 24 have a crystalline, irregular, approximately polygonal structure. The ground polystyrene is sorted using 12- and 20-mesh screens so that two collections of approximately uniformly sized, but irregularly shaped, particles are obtained at step 26. Depending on the consistency of the shape and size of the initial mix of particles, the particles may be presorted, for example, by using a screen of 8- or 10-mesh size to separate any particles that are too large, and further sorted using a screen of 22- or 24-mesh size to separate particles that are too small.

In step 28, equal parts of the 12- and 20-mesh sorted, ground polystyrene are combined to obtain a filler of crystalline particles for use with the binding mixture of step 22. It has been found that the specific combination of the 12- and 20-mesh sorted polystyrene yields a composition that is both sufficiently uniform to be pleasing to the touch, but also sufficiently diverse to produce very interesting results in the final composition.

For reference, a 12-mesh screen is one with wire spacing of approximately 1.4-millimeters, and a 20-mesh screen has wire spacing of approximately 0.8-millimeters. Using these size screens, particles having a maximum dimension of slightly less than 2-millimeters are obtained from the 12-mesh screening, and particles having a maximum dimension of slightly less than 1-millimeter are obtained from the 20-mesh screening. It is believed that the maximum particle size may be increased to approximately three millimeters, and decreased to approximately one-half millimeter to obtain compositions that are within the scope of the present invention. However, the specific combination of particles described above in connection with step 28 is preferred.

Polystyrene is preferred for the filler because it is relatively clear and, when crushed, forms irregularly shaped, approximately polygonal crystals. The clearness of the polystyrene makes the resulting composition very translucent, and thus more like snow. It also allows the composition to be used for making lit or illuminated sculptures. A simple flashlight bulb or other safe light source placed within a hollow shape made of my preferred composition makes the entire shape glow.

Figure 2:
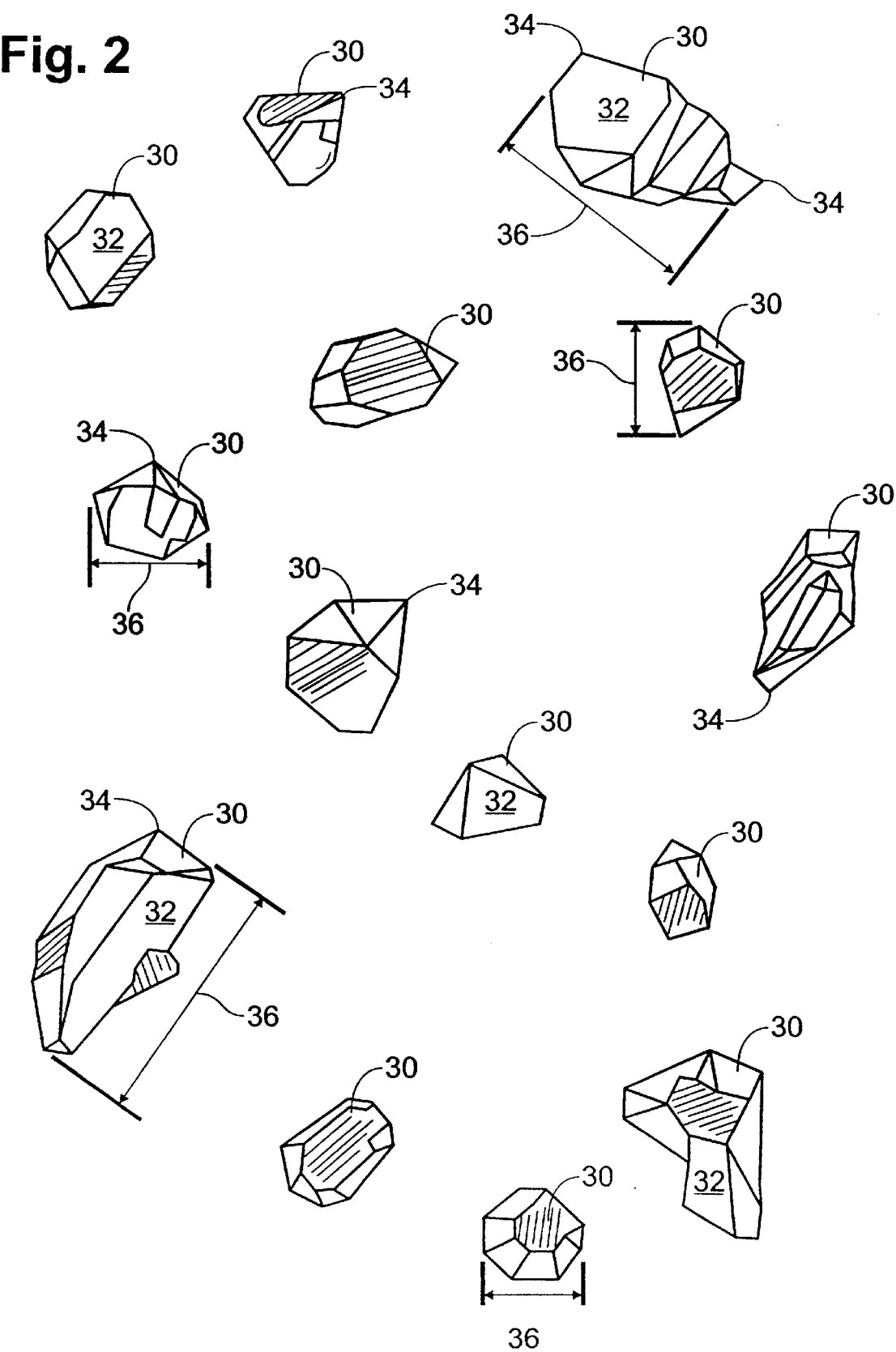
FIG. 2 is a perspective view of several of the particles of the preferred crystalline filler, shown on a greatly enlarged scale.

Referring to FIG. 2, several particles 30 of polystyrene are shown in greatly enlarged form. The irregular polygonal nature of particles 30 causes a unique and rather surprising interaction among particles 30 in the final compositions of the present invention. This interaction is believed important in creating the coarse, gritty, snow-like feeling of the compositions. The numerous somewhat-planar surfaces 32 and apexes 34 of the particles also are believed to interact with the binding mixture of step 22 to create the many surprising and exciting properties of my compositions when they are squeezed, molded, extruded, compacted, stretched, and otherwise played with. This unique interaction between the physical properties of the particles and the chemical properties of the preferred binding mixture makes my compositions suitable for a broad range of creative projects, many of which have yet to be discovered. For reference, the maximum dimension of a few particles is identified at 36.

Returning attention to FIG. 1, at step 38 the polystyrene from step 28 is mixed with the binding mixture of step 22 for one-half hour, or until homogeneous. A lubricant such as PENETECK, a white mineral oil available from Penreco, is then blended into the composition, and the composition is mixed for one-fourth of an hour, at step 40.

In some instances, the exact ratios of the identified components may vary substantially without departing from the nature and scope of my invention, as defined in the claims herein. For example, the humectant, which serves to keep the compositions usable for extended periods of time, even if left outside of a container for several days, may be omitted. For some modeling projects, it may be desired that the created item harden or otherwise cure after prolonged contact with air.

I have set forth below in Table 1 ranges of the various components discussed above that I believe produce workable compositions.

TABLE 1

| Component | Percentage by weight |
| --- | --- |
| humectant | 20 to 35 |
| cellulose-based thickener | 0.2 to 2 |
| polyvinyl alcohol | 0.5 to 5 |
| preservative | 0 to 3 |
| sodium cabonate | 0.2 to 2 |
| borax | 0.5 to 5 |
| crystalline filler | 50 to 75 |

Set forth below in Table 2 are the approximate percentages by weight of the various components found in one embodiment of the present invention. This embodiment has been found to be a snow-like moldable composition that is particularly well-suited for use by young children. It is interesting to touch, easy to use, and intriguing to deform. It also is manufactured easily and relatively economically using the method described above.

TABLE 2

| Component | Percentage by weight |
| --- | --- |
| propylene glycol | 25.72 |
| KLUCEL HF | 0.90 |
| AIRVOL 205 | 1.98 |
| deionized water | 5.94 |
| PHENONIP | 0.44 |
| sodium carbonate | 0.39 |
| sodium tetraborate(anhydrous) | 2.04 |
| polystyrene | 62.34 |
| PENETECK | 0.25 |

More specific ranges of components than those listed in Table 1 have been found to produce satisfactory results, although not so preferred as those listed in Table 2. For example, the ranges of components listed below in Table 3 are within the scope of the present invention.

TABLE 3

| Component | Percentage by weight |
| --- | --- |
| humectant | 23 to 28 |
| cellulose-based thickener | 0.5 to 1.5 |
| polyvinyl alcohol | 1 to 3 |
| preservative | 0 to 0.7 |
| sodium carbonate | 0 to 1 |
| borax | 1.5 to 2.5 |
| crystalline filler | 55 to 70 |

Even more specifically, the following ranges of the components from Table 2 are believed to produce satisfactory results for various embodiments of modeling compositions, also within the scope of the present invention.

TABLE 4

| Component | Percentage by weight |
|---|---|
| propylene glycol | 24 to 27 |
| Klucel HF | 0.8 to 1.0 |
| Airvol 205 | 1.5 to 2.5 |
| deionized water | 5 to 7 |
| Phenonip | 0.4 to 0.5 |
| sodium carbonate | 0.4 to 0.5 |
| sodium tetraborate (anhydrous) | 1.7 to 2.3 |
| polystyrene | 60 to 65 |
| Peneteck | 0.2 to 0.3 |

While the present invention has been shown and described by reference to the preferred embodiment, it will be apparent to those skilled in the art that other changes in form and detail may be made therein without departing from the spirit and scope of the invention defined in the appended claims.

I claim:

1. A moldable composition comprising a water-soluble polyvinyl binder, water, a cross-linking agent for the binder, a humectant, and a filler that consists essentially of crystalline particles having a maximum dimension of between one-half and three millimeters.

2. The moldable composition according to claim 1, wherein the crystalline particles are irregular in shape.

3. The moldable composition according to claim 1, wherein the binder is polyvinyl alcohol.

4. The moldable composition according to claim 1, wherein the agent is borax.

5. The moldable composition according to claim 1, further comprising sodium carbonate.

6. The moldable composition according to claim 1, further comprising a thickener.

7. The moldable composition according to claim 6, wherein the thickener comprises hydroxypropyl cellulose.

8. The moldable composition according to claim 1, wherein the crystalline particles are polystyrene.

9. The moldable composition according to claim 1, wherein the crystalline particles are present in a concentration of at least 50-percent by weight of the composition.

10. The moldable composition according to claim 1, wherein the composition is translucent.

11. A moldable composition comprising a water-soluble polyvinyl binder, water, a cross-linking agent for the binder, a humectant, and a filler that consists essentially of approximately polygonal particles.

12. The moldable composition according to claim 11, wherein the polygonal particles are irregular in shape.

13. The moldable composition according to claim 11, wherein the binder is polyvinyl alcohol.

14. The moldable composition according to claim 11, wherein the agent is borax.

15. The moldable composition according to claim 11, further comprising sodium carbonate.

16. The moldable composition according to claim 11, further comprising a thickener.

17. The moldable composition according to claim 16, wherein the thickener comprises hydroxypropyl cellulose.

18. The moldable composition according to claim 12, wherein the polygonal particles are polystyrene.

19. The moldable composition according to claim 11, wherein the polygonal particles are present in a concentration of at least 50-percent by weight of the composition.

20. The moldable composition according to claim 11, wherein the polygonal particles consist essentially of particles having a maximum dimension of between one-half and three millimeters.

21. The moldable composition according to claim 11, wherein the composition is translucent.

22. A moldable composition comprising a binding mixture, a binder dispersed within the binding mixture, and a crystalline filler made from particles of ground polystyrene dispersed within the binding mixture, wherein substantially each particle of ground polystyrene has a maximum dimension in the range of one-half to three millimeters.

23. The moldable composition according to claim 22, wherein the crystalline filler is present in a concentration of at least 50-percent by weight of the composition.

24. The moldable composition according to claim 22, wherein the composition is translucent.

25. The moldable composition according to claim 22, wherein the polystyrene is translucent.

26. A moldable composition comprising, in the ranges of percentages by weight listed:

| | |
|---|---|
| humectant | 20 to 35 |
| cellulose | 0.2 to 2 |
| polyvinyl alcohol | 0.5 to 5 |
| preservative | 0 to 3 |
| sodium carbonate | 0.2 to 2 |
| borax | 0.5 to 5 |
| crystalline filler | 50 to 75 |

27. A method of making a moldable composition approximately simulating snow, comprising the steps of:

providing a water-soluble polyvinyl binding mixture;

grinding or crushing a clear, solid material to produce particles having an irregular, approximately polygonal shape;

sorting the particles to obtain a collection of particles having a maximum dimension in the range of one-half to three millimeters; and mixing the collection of particles with the binding mixture until a homogeneous composition is obtained.

28. The method according to claim 27, further comprising the step of blending a lubricant into the composition.

29. A moldable composition comprising a water-soluble polyvinyl binder, water, a cross-linking agent for the binder, a humectant, and a filler that consists essentially of crystalline polystyrene particles.

30. A moldable composition comprising a water-soluble polyvinyl binder, water, a cross-linking agent for the binder, a humectant, and a filler that consists essentially of crystalline particles present in a concentration of at least 50-percent by weight of the composition.

* * * * *